United States Patent [19]

Tkac et al.

[11] 4,334,952
[45] Jun. 15, 1982

[54] MULTISTAGE MOLECULAR EVAPORATOR WITH WIPED OFF FILM AND CONTINUOUS REDISTILLATION

[75] Inventors: Alexander Tkac; Ján Cvengros, both of Bratislava, Czechoslovakia

[73] Assignee: Slovenska vysoka skola technicka, Bratislava, Czechoslovakia

[21] Appl. No.: 205,626

[22] Filed: Nov. 10, 1980

[51] Int. Cl.³ .............................................. B01D 1/22
[52] U.S. Cl. .................................... 159/11 R; 159/12; 159/6 W; 202/173; 202/187
[58] Field of Search ............................... 203/72, 74, 77; 202/173, 236, 187; 159/13 R, 13 A, 6 W, 11 R, 12

[56] References Cited

U.S. PATENT DOCUMENTS

| 2,078,841 | 4/1937 | Fauth | 203/72 |
| 2,614,973 | 10/1952 | Burrows | 159/13 R |
| 3,434,935 | 3/1969 | Habendorff et al. | 159/6 W |
| 4,053,006 | 10/1977 | Tkac et al. | 159/6 W |

FOREIGN PATENT DOCUMENTS 524439  8/1940 United Kingdom .................. 203/77

Primary Examiner—Norman Yudkoff

[57] ABSTRACT

A liquid seal for a multistage molecular evaporator which is in the form of an elongated vessel having convex evaporating surfaces for carrying out a continuous redistillation. The evaporator includes at least two vacuum stages superposed one over the other in the vessel. The upper stage has two inwardly extending troughs one superposed over the other. An overflow tube extends from the upper trough into a collecting trough of the adjacent lower vacuum stage to form a first liquid seal. A collecting member in the upper stage extends into the lower trough of the upper stage to collect distillate therein and to form a second liquid seal therein. The upper and lower vacuum stages have evaporator bodies which are connected to each other by sealing means.

2 Claims, 3 Drawing Figures

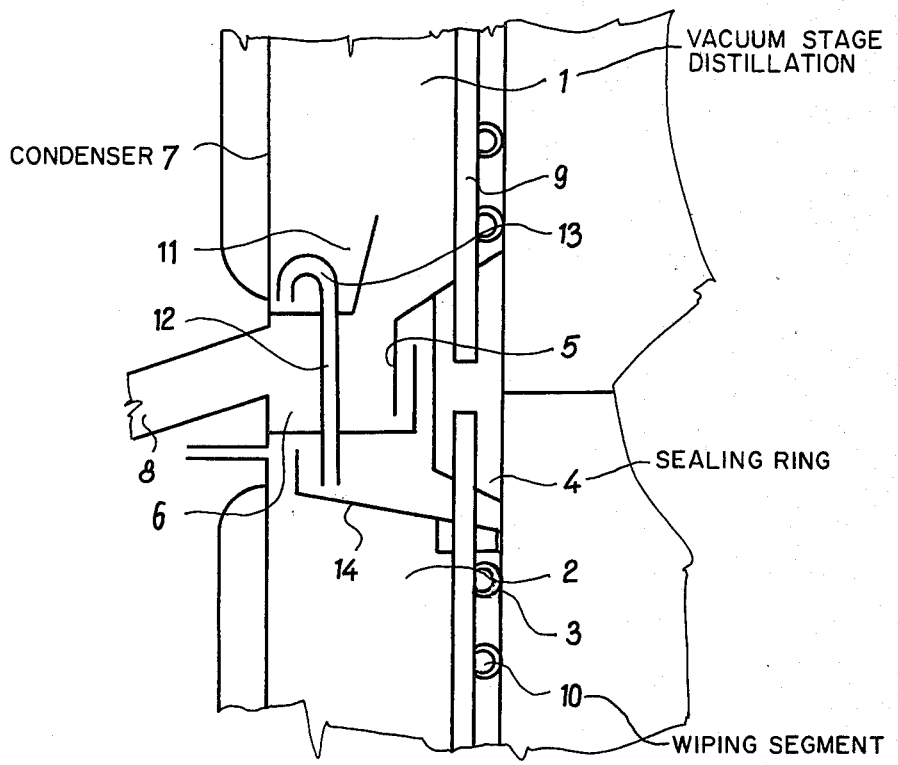
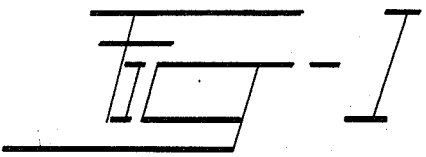
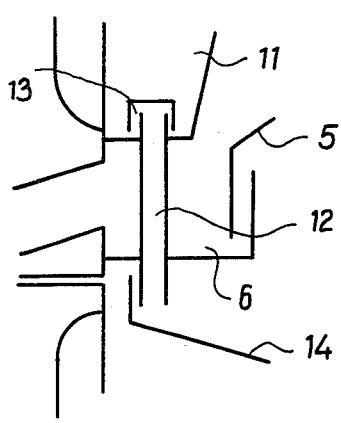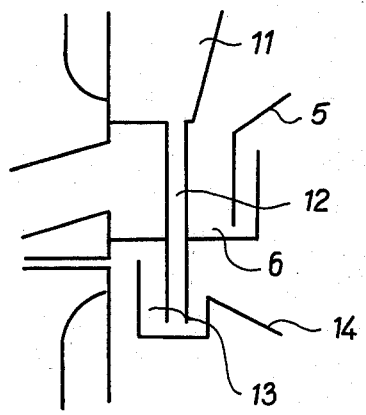

MULTISTAGE MOLECULAR EVAPORATOR WITH WIPED OFF FILM AND CONTINUOUS REDISTILLATION

BACKGROUND OF THE INVENTION

The invention relates to a multistage molecular evaporator with wiped off film with only one evaporating body with convex evaporating surface and with continuous redistillation. In the known apparatus for molecular distillation a number of devices are incorporated in such a way as to make possible a repeated distillation. This is a requirement because the separating ability of molecular evaporators is low for fundamental reasons as it represents approximately one theoretical evaporator plate. When a higher separation efficiency is needed or when a mechanical spouting of the distilled substance from the evaporating to the condensing surface occurs, repeated distillations have to be carried out either in one multistage device or in several apparatus connected to each other in a battery. Charging apparatus with numerous repeated distillations carried out in a cascade of distillation steps are described in the prior art as well as film apparatus with repeated distillation wherein liquid film is formed by the action of gravity or apparatus rotation (see our U.S. Pat. No. 4,053,006). A common drawback of these known distillation devices resides in that liquid mixing, respectively wiping off the running-down film is lacking, low evaporative capacity, low separating ability, long residing time and thermal decomposition are exhibited and, moreover, these known devices have complicated constructions. There is also known an apparatus with a centrifugal evaporating surface and with a divided condenser which is described in U.S. Pat. No. 2,234,166. This known apparatus is, however, from a constructional point of view, very complex and costly, and it has a low-effective heating of the high-speed rotating evaporating surface. Increased separating capability is primarily achieved by means of built-in materials and barriers mounted in the distillation space of molecular evaporators having means for wiping off film. In these known installations, the character of molecular distillation is nevertheless suppressed, or it is necessary to link a battery of a plurality of single evaporators in such a way that distillate from one evaporator is subjected to repeated distillation in other evaporators. The drawbacks of these known arrangements are as follows: they are complex to operate and require attendance by operating personnel; heated connecting members and intermediate pumping is needed, the contact time of the treated substance with heating surfaces is extended and due to the fact that a large number of packings and pumps are used, the danger of contamination with aerial oxygen increases. These drawbacks are partially eliminated in the continuous multistage molecular evaporator having only one evaporating body according to Czechoslovak invention No. AO 181054, and U.S. Pat. No. 4,053,006. This evaporator has several rotating liquid seals mounted in the space between the condensing and evaporating surfaces in a common evaporating body, which are conveniently mounted in such a way thay they mutually separate two adjoining vacuum stages. The rotating liquid seals are so constructed that they permit the passage of residues from the preceding vacuum stage into the next following vacuum stage as a feed. Redistillation cannot be, however, carried out in this multistage molecular evaporator with one evaporator body.

SUMMARY OF THE INVENTION

The afore-mentioned multistage molecular evaporator with wiped off film having only one evaporating body is improved in accordance with this invention. The molecular evaporator of this invention includes a liquid seal on the distillate side which is formed by an overflow tube connecting a collecting trough with a conveying funnel having a separator, and a liquid seal on the residue side is formed between a run-off-trough held by a condenser of the preceding stage and an arm attached at a sealing ring which is tightly slipped on the evaporating body and is connected to supporting rods.

The multistage molecular evaporator having only one evaporating body with continuous redistillation, in accordance with the invention has, if compared with the heretofore known types, several advantages. Thus, while the evaporator of the invention maintains all the known principles for maximum distillation output relative to the unit of evaporating surface and a high separating, it also has all the advantages of the arrangement of a continuous multistage evaporator with only one evaporating body, as for example, wiping off the liquid on all thermally exposed surfaces in the apparatus; absence of joining elements and minimum use of pumps; advantageous thermal economics; possibility of using different temperatures in single stages; evaporating body in the shape of a cylinder; a conical shape or combination thereof; only one shaft for the scraper drive in all the stages; vacuum packing in the stage with the lowest vacuum; and others. The apparatus of the invention makes possible a repeated distillation of condensate from the preceding stage to the following stage. The condensate does not come into contact with ambient oxygen between two distillations. By formation of two liquid seals, one on the distillate side and the second on the residue side, and the maintenance of a vacuum-tight separation of the preceding vacuum stage from following one, different vacuums in these two stages can be used. The distillation quality is sharply improved by redistillation and the distillation output can be enhanced by recycling residue from the following stage. Redistillation in the multistage molecular evaporator according to the invention is exceptionally advantageous in those cases when the feed contains traces of solid particles such as, for example, residue of adsorbents, catalysts and other mechanical impurities, which residues are permanent sources of vigorous evolution of gases and vapors, accompanied by a mechanical release of distilled liquid onto the condensing surface. It is advantageous to distill off a maximum of the feed in preceding vacuum stage, after crossing both streams there is removed from the apparatus the mentioned admixtures present in the residue as quickly as possible and crude distillate is fed back onto the evaporating surface and subjected to repeated uninterrupted molecular distillation in the following stage. The same reasons for repeated distillation exist also in the case of highly-viscous residues, whereby with increased viscosity spouting optional thermal decomposition as a result of local overheating can occur. A full or partial mechanical discharge depreciates the distillate.

BRIEF DESCRIPTION OF THE DRAWING

The invention is illustrated in the attached drawing, wherein several embodiments are illustrated by way of example.

FIG. 1 is a partial elevational schematic view of a multistage molecular evaporator having a single evaporating body and continuous redistillation.

FIGS. 2 and 3 are schematic elevational views of two variants of the liquid seal on the distillate side.

DETAILED DESCRIPTION

Two stages of the multistage molecular evaporator are illustrated in the afore-mentioned drawing, that is preceding vacuum stage 1 and following vacuum stage 2, which is formed in the space between evaporating body 3 and condenser 7. Sealing ring 4 is tightly slipped on the evaporating body 3, which ring is connected with arm 5 which extends into run-off-trough 6. The trough 6 is fixed on condenser 7 and is in communication with the residue outlet tube 8. Sealing ring 4 is connected with supporting rods 9 to which wiping segments 10 are attached. On the condenser 7 of a preceding vacuum stage 1, mounted above stage 2, collecting trough 11 is attached; the collecting trough 11 is connected with an overflow tube 12 in which a liquid seal 13 is formed. A conveying funnel having separator 14 is attached to supporting rods 9 in the following vacuum stage 2. Treated liquid flows down along the evaporating body 3 in the preceding vacuum stage 1; this liquid is successively distilled and the distillation residue flows down along sealing ring 4 and arm 5 where it forms a liquid seal on the residue side in the run-off-trough 6. Condensate from the preceding vacuum stage 1 is captured on condenser 7 in the preceding vacuum stage 1 and it flows down into the collecting trough 11 wherefrom it is conveyed by overflow tube 12 through liquid seal 13 into following vacuum stage 2 by way of the conveying funnel with separator 14 back to the evaporating body 3. The The liquid seal 13 formed in overflow tube 12 can have various shapes and it can be of the stationary type as is for example illustrated in FIGS. 1 and 2, or it can be a rotating type, as is illustrated in FIG. 3. In the multistage molecular evaporator of the invention a plurality of overflow tubes 12 and liquid seals 13 can be simultaneously used for separation of two adjoining vacuum stages, optionally even more vacuum stages in the apparatus can be mutually separated in this way. The run-off-trough 6 can be heated depending on needs.

Multistage molecular evaporator with redistillation can be advantageously used for example at recovery of waste engine oils by molecular distillation, at refining synthetic oils containing residues of catalysts and neutralization agent, and in other fields.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

This application is related to TKAC ET AL application Ser. No. 205,269 filed simultaneously herewith.

What is claimed is:

1. A liquid seal for a multistage molecular evaporator having an evaporator vessel with a convex evaporating surface adapted to carry out a continuous redistillation, comprising in combination, a first vacuum stage having a first cylindrical portion surrounding the evaporating surface, a second vacuum stage having a second cylindrical portion mounted below said first stage;

an inwardly projecting first trough mounted on said first cylindrical portion and adapted to collect distillate formed therein, an overflow tube extending from said first trough downwardly into said second stage;

an overflow collecting and separating means mounted in said second stage below said overflow tube and adapted to receive distillate from the first vacuum stage; said inwardly projecting first trough, overflow tube and overflow collecting and separating means forming a first liquid seal;

an inwardly projecting second trough mounted on said first cylindrical portion below said first trough;

a member mounted in said first stage and extending into said second trough, said member adapted to collect distilland from said first stage and conduct it into said second trough; said second trough and member extending therein adapted to form a second liquid seal;

said first and second stages having evaporator means; and sealing ring means disposed between the evaporator means of said first and second stages to sealingly connect them to each other.

2. The liquid seal for a multistage molecular evaporator as set forth in claim 1, wherein said first and second vacuum stages are rotatable relative to each other.

* * * * *